Figure 1:
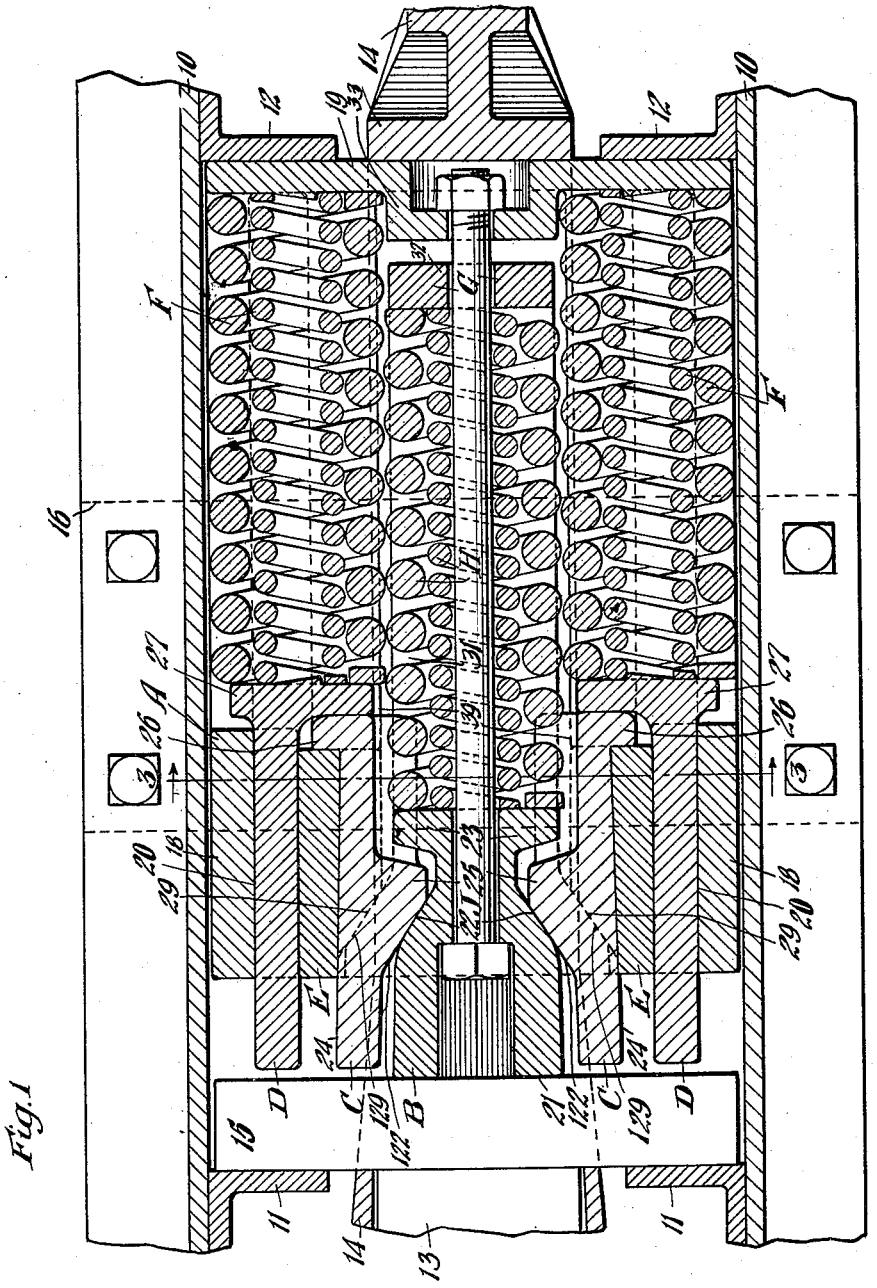

Nov. 8, 1927.  
S. B. HASELTINE  
FRICTION SHOCK ABSORBING MECHANISM  
Filed May 24, 1926
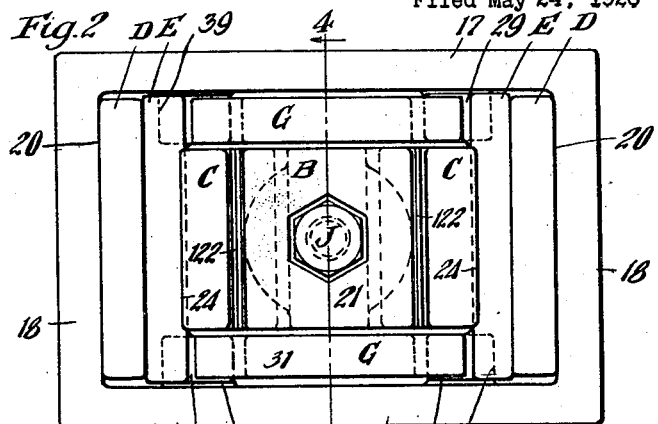
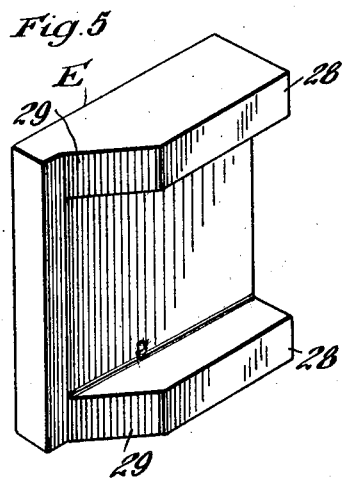
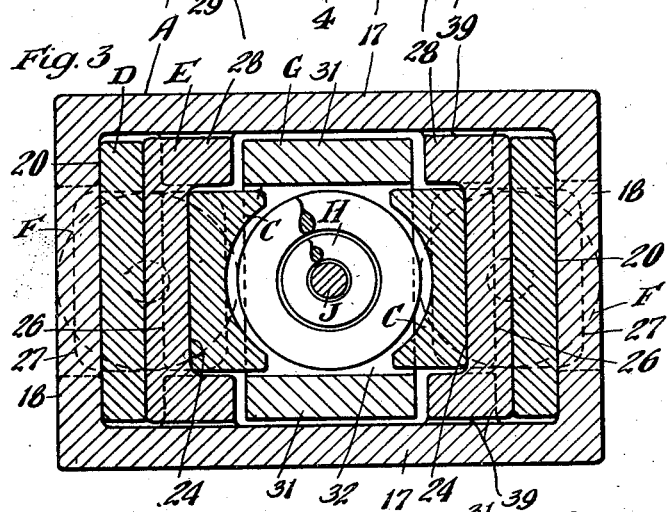
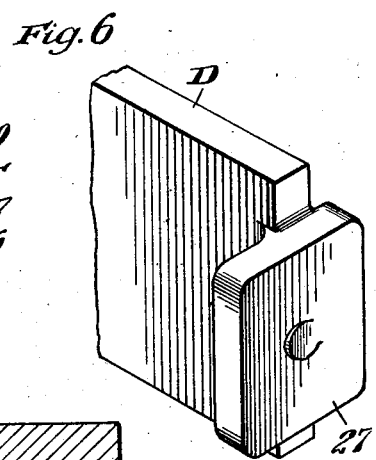
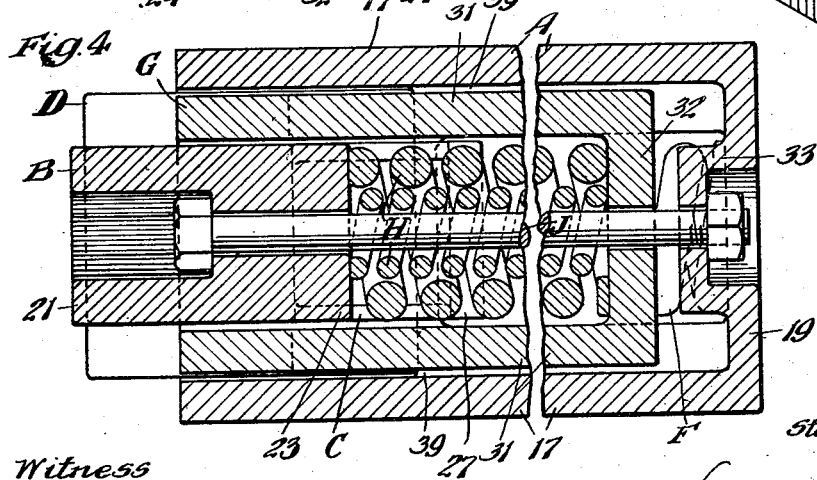
Inventor  
Stacy B. Haseltine Patented Nov. 8, 1927.

1,648,306

UNITED STATES PATENT OFFICE.

STACY B. HASELTINE, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed May 24, 1926. Serial No. 111,163.

This invention relates to improvements in friction shock absorbing mechanisms.

One object of the invention is to provide a friction shock absorbing mechanism of high capacity, especially adapted for railway draft riggings, including a plurality of relatively movable friction elements together with means for placing the elements under lateral pressure, wherein the lateral pressure means contains a compressible yielding element adapted to gradually increase the lateral pressure as the mechanism is compressed.

Another object of the invention is to provide a friction shock absorbing mechanism including a plurality of relatively movable friction elements and spreading means for placing the friction elements under lateral pressure, wherein the action of the spreading means equalizes the pressure at the front and rear ends of the friction elements.

A further object of the invention is to provide a friction shock absorbing mechanism of the inter-calated plate type including friction shoes co-operating with friction plates and wedge means for spreading the shoes and additional means yieldingly actuated by the wedge means for placing the plates under lateral pressure.

Still another object of the invention is to provide a friction shock absorbing mechanism of the inter-calated plate type, including means for placing the plates under lateral pressure, comprising a wedge element co-operating with friction shoes engaging certain of the plates to effect movement thereof with reference to the remaining plates which are relatively fixed, and additional yieldingly actuated means having wedging engagement with the fixed plates.

In the drawing, forming a part of this specification, Figure 1 is a longitudinal, horizontal, sectional view of a portion of a railway draft rigging, showing my improvements in connection therewith. Figure 2 is a front end elevational view of the shock absorbing mechanism proper. Figure 3 is a transverse, vertical, sectional view corresponding substantially to the line 3—3 of Figure 1. Figure 4 is a longitudinal sectional view corresponding substantially to the line 4—4 of Figure 2, the view being partly broken to accommodate it to the sheet of the drawing. Figures 5 and 6 are detailed perspective views of two different friction plates employed in connection with my improved mechanism.

In said drawings, 10—10 indicate channel-shaped center or draft sills of a railway car underframe, to the inner faces of which are secured front stop lugs 11—11 and rear stop lugs 12—12. The inner end portion of the drawbar is designated by 13, to which is operatively connected a yoke 14 of usual form. The shock absorbing mechanism proper, as well as a front main follower 15, is disposed within the yoke, and the yoke and the parts therewithin are in turn supported in operative position by a detachable saddle plate 16 fixed to the draft sills.

The improved shock absorbing mechanism proper, as shown, comprises broadly: a casing A; a main wedge B; a pair of friction shoes C—C; a pair of movable friction plates D—D; a pair of friction plates E—E fixed with relation to the casing; a main spring resistance element F—F; a wedge yoke G; an auxiliary spring resistance H; and a retainer bolt J.

The casing A is of generally rectangular box-like form having horizontally disposed spaced top and bottom walls 17—17, longitudinally extending vertical spaced side walls 18—18 and a transverse rear end wall 19 co-operating with the rear stop lugs 12 in the manner of the usual rear follower. As most clearly shown in Figure 1, the side walls of the casing A are left open for the greater part of their length to permit insertion of the main springs and other elements. The two side walls 18 are provided with longitudinally disposed flat friction surfaces 20—20 on the inner sides thereof.

The main wedge B is in the form of a cast block having a flat front end face 21 adapted to bear on the inner surface of the main follower 15. Adjacent the rear end, the wedge block B has a pair of wedge faces 22—22 on the opposite sides thereof converging inwardly of the mechanism. Rearwardly beyond the wedge faces 22 the wedge block B is laterally enlarged, as indicated at 23, thereby providing an abutment for the front end of the auxiliary spring resistance H.

The friction shoes C, which are of like design, are disposed at opposite sides of the wedge member and co-operate with the wedge faces thereof. Each shoe C has a flat longitudinally extending outer surface 24 adapted to co-operate with the friction plate E at the corresponding side of the mechanism. On the inner side, that is, the side nearest the wedge, each shoe C has an enlargement 25 provided with a wedge face 122 adapted to co-operate with the wedge face 22 at the corresponding side of the wedge B. At the rear end, the shoe C has a vertically disposed lateral flange 26 adapted to bear on the rear end of the corresponding friction plate E and also bear on a lateral flange on the adjacent friction plate D hereinafter more fully described. Rearwardly of the enlargement 25, each friction shoe C is cut away on a curve as shown in Figures 1 and 3 to accommodate the corresponding flange 23 of the wedge block B, which is preferably also of curved outline.

The friction plates D which are two in number, are disposed at opposite sides of the mechanism. The plates D are of similar design and as most clearly shown in Figure 6, each plate has a transverse section 27 at the rear end thereof presenting a relatively wide flange on the inner side of the plate and a relatively narrower flange on the outer side thereof. The end section 27 of each plate D is adapted to bear on the outer end of the corresponding main spring resistance element F and the relatively wide laterally extending flanged portion on the inner side thereof forms an abutment for the corresponding flange 26 of the shoe C at the same side of the mechanism. Each of the friction plates D has a longitudinally disposed flat outer friction surface adapted to cooperate with the friction surface 20 at the same side of the shell and a longitudinally disposed flat friction surface on the inner side thereof adapted to cooperate with the friction plate E at the same side of the mechanism.

The friction plates E, which are also two in number, are disposed at opposite sides of the mechanism. As most clearly shown in Figures 1, 3 and 5, each of the friction plates E comprises a vertically disposed main body portion and top and bottom horizontally disposed sections 28—28 in the form of relatively wide lateral flanges. The sections 28 are provided with wedge faces 29—29 at the front ends thereof, adapted to cooperate with similar wedge faces on the yoke G hereinafter more fully described. The main body portion of each plate E has a flat friction surface on the outer side thereof adapted to cooperate with the inner surface of the corresponding plate D and a flat friction surface on the inner side thereof adapted to cooperate with the friction surface 24 of the corresponding friction shoe C. The friction surfaces on the inner sides of the plates E preferably converge inwardly of the mechanism. The friction plates E are held against inward movement longitudinally of the casing A, the inner ends thereof bearing on lugs 39—39 projecting inwardly from the top and bottom walls 17—17 of the casing.

The main spring resistance elements F—F, which are two in number, are disposed at opposite sides of the mechanism. Each member of the spring resistance element F comprises a relatively heavy outer coil and a relatively light inner coil, the coils having their opposite ends bearing on the end wall 19 of the casing A and the transverse end section 27 of the corresponding movable friction plate D. As most clearly shown in Figures 1 and 6, both the friction plates D and the end wall 19 of the casing A are provided with inwardly projecting lugs adapted to engage within the corresponding ends of the inner coil of the main spring resistance element, thereby holding the two coils of the spring member properly centered.

The wedge yoke G is open at the forward end, as most clearly shown in Figures 2 and 4, and comprises top and bottom arms 31—31 and a transverse vertically disposed connecting section 32 at the rear end thereof. The arms 31 are laterally enlarged at the front end thereof and the enlargements are provided with inwardly converging wedge faces 129—129 at the opposite sides thereof adapted to co-operate with the corresponding wedge faces 29 at the top and bottom edges of the friction plates E. The front ends of the arms 31 straddle the wedge member as most clearly shown in Figure 4, and thereby serve as a centering means for the same.

The auxiliary spring resistance element H is interposed between the transverse end section 32 of the yoke and the enlargement 23 at the rear end of the wedge block B. The spring resistance H preferably consists of an outer relatively heavy coil, and an inner lighter coil.

The retainer bolt J has its opposite ends anchored to the end wall 19 of the casing A and the wedge block B, the head of the bolt being accommodated within an opening provided in the block B, and the nut of the bolt being accommodated within a hollow boss 33 projecting inwardly from the end wall 19 of the casing A. The shank of the bolt extends through aligned openings in the hollow boss 33, end section 32 of the yoke G and wedge block B. The retainer bolt J serves to maintain the parts of uniform overall length and hold the same under initial compression. All of the springs are preferably under initial compression when the parts are assembled, the retainer bolt J holding the spring H under initial compression and the springs F being held under initial compression by the plates D through the medium of the plates E and friction shoes C.

which in their normal released position are held against outward movement by engagement with the wedge faces of the yoke G and the wedge block B respectively. It will be evident that due to the initial compression under which the springs are placed, compensation for wear of the various friction and wedge faces is had.

The normal position of the parts is that shown in Figure 1, wherein both the friction shoes and the movable friction plates D have their outer ends spaced from the main follower 15.

The operation of my improved shock absorbing mechanism upon a compression stroke is as follows: The front follower 15 and the wedge block B will be moved inwardly toward the casing A, thereby setting up a wedging action between the wedge faces of the block and the shoes. Due to the inward movement of the block B, there will also be a compression of the auxiliary spring resistance H at this time, thereby urging the wedging yoke G rearwardly and setting up a wedging action between the wedge faces of the yoke and the plates E which are held against longitudinal movement inwardly of the casing. Due to the spreading action of the wedge member and the yoke G, the friction plates E and D will be forced laterally outwardly and the latter will be brought into intimate frictional contact with the friction surfaces of the casing A and the friction plates E. As the action of the mechanism progresses, the shoes C will be carried inwardly of the casing A with the wedge B, slipping on the friction surfaces of the plates E. Inasmuch as the inner ends of the shoes bear on the lateral enlargements at the rear ends of the plates D, the plates D will be carried inwardly in unison with the shoes, thereby compressing the main spring resistance elements F. During their inward movement, the plates D will slip on the friction surfaces of the plates E and the casing A. During the last described action of the mechanism, the spring H will also be further compressed, thereby increasing the pressure on the yoke G and increasing the wedging action between the wedge faces of the yoke and the friction plates E. The described action will continue either until the actuating force is reduced or the front main follower 15 comes into engagement with the front end of the casing A, whereupon the pressure will be transmitted directly through the casing to the stop lugs of the draft sills, the casing functioning as a column load transmitting element relieving the springs from excessive pressure. It is pointed out that during the compression of the mechanism, the follower 15 at no time comes into engagement with the outer ends of the friction plates D or the shoes C, the friction plates D being at all times carried inwardly by the shoes through the action of the wedge member B. It is also pointed out that during the progressive action of the mechanism, as the shoes move inwardly of the casing A, the lateral pressure on the friction plates E will be balanced, due to the front end of the yoke being in wedging engagement with the wedge faces on the plates E. It will be evident that on account of the compression of the spring H during the action of the mechanism, the wedging action of the yoke with reference to the plates E will be gradually augmented. Sufficient clearance is provided between the inner end of the yoke and the boss 33 on the end wall 19 of the casing A to permit the necessary inward movement of the yoke to set up wedging action between the yoke and the plates E without the inner end of the yoke coming into actual engagement with the boss 33.

Upon reduction of the actuating force, the expansive action of the auxiliary spring resistance H will tend to force the wedge B outwardly independently of the releasing action of the remaining elements of the mechanism. The springs F will restore the plates and the other parts to normal position. Outward movement of the wedge friction shoes C being limited by engagement with the wedge faces of the wedge block B and outward movement of the plates E being limited by engagement with the wedge faces of the yoke G. Movement outwardly of the plates D will be limited by the shoes C, the inner ends of which are engaged by the lateral enlargements at the rear ends of the plates D.

While I have herein shown and described what I now consider the preferred manner of carrying out my invention, the same is merely illustrative, and I contemplate all changes and modifications that come within the scope of the claims appended hereto.

I claim:

1. In a friction shock absorbing mechanism, the combination with a friction shell; of a plurality of relatively movable friction plates within the shell; wedge pressure means; friction shoes co-operating with said wedge pressure means and having frictional engagement with said plates; a main spring resistance opposing relative movement of said plates; yoke means within the shell, said yoke means and certain of said plates having co-acting wedge faces; and an additional spring resistance opposing relative movement of said wedge and yoke means.

2. In a friction shock absorbing mechanism, the combination with a column load sustaining member having longitudinally disposed friction surfaces; of movable friction plates co-operating with said friction surfaces; additional friction plates held against longitudinal movement with reference to said member, all of said plates having lateral play; means for forcing said plates laterally against said member, said means including pressure transmitting spreading means and a yoke, said yoke and certain of said plates having co-operating wedge faces; and spring resistance means opposing movement of said plates and spreading means, said spring resistance means including an element interposed between the pressure transmitting means and the yoke.

3. In a friction shock absorbing mechanism, the combination with a friction shell having longitudinally disposed friction surfaces; of a plurality of relatively movable, friction plates within the shell, said plates being divided into two sets at opposite sides of the mechanism; friction shoes co-operating with the plates; pressure transmitting means interposed between the shoes and having wedging engagement with the latter; a main spring resistance; a yoke member within the shell, said yoke member having wedging engagement with certain of said plates; and means for yieldingly transmitting the pressure from said pressure transmitting means to the yoke.

4. In a friction shock absorbing mechanism, the combination with a friction shell having interior friction surfaces; of a plurality of friction plates co-operating with said friction surfaces, said plates and shell being relatively movable longitudinally of the mechanism; a spring resistance opposing relative movement of said plates and shell; a plurality of friction plates held against longitudinal movement with reference to the shell; friction shoes co-operating with the last-named plates, said shoes engaging said movable plates to effect movement of the latter; a yoke element within the shell, said yoke and second-named plates having co-operating wedge faces; a wedge pressure transmitting member interposed between the shoes and having wedging engagement therewith; and spring resistance means interposed between the wedge pressure transmitting member and yoke.

5. In a friction shock absorbing mechanism, the combination with a friction shell having interior friction surfaces; of a plurality of intercalated relatively movable friction plates within the shell, certain of said plates having wedge faces thereon and the remaining plates having frictional engagement with the shell surfaces; and spreading means for placing said plates under lateral pressure, said spreading means including a yoke having wedging engagement with the plates provided with wedge faces; a pressure transmitting member; and yielding means for transmitting the pressure from said member to the yoke.

6. In a friction shock absorbing mechanism, the combination with a friction shell having longitudinally disposed friction surfaces; of a plurality of relatively movable inter-calated friction plates within the shell co-operating with friction surfaces thereof; means for yieldingly opposing relative movement of said plates; means comprising a plurality of elements for placing the plates under lateral pressure, one of said elements being in the form of a yoke member, another of said elements receiving the actuating force and having wedging engagement with others of said elements, said last-named elements engaging certain of said plates to effect movement thereof with respect to the remaining plates, said remaining plates having wedging engagement with the yoke member; and yielding means interposed between said yoke element and the element which receives the actuating force.

In witness that I claim the foregoing I have hereunto subscribed my name this 19th day of May 1926.

STACY B. HASELTINE.